US012792549B2

(12) United States Patent
Srivastava et al.

(10) Patent No.: US 12,792,549 B2
(45) Date of Patent: Nov. 10, 2026

(54) CHANNEL DIRECTION MANAGEMENT FOR BUS INTERFACES

(71) Applicant: QUALCOMM Incorporated, San Diego, CA (US)

(72) Inventors: Prakhar Srivastava, Lucknow (IN); Santhosh Reddy Akavaram, Hyderabad (IN); Yogananda Rao Chillariga, Hyderabad (IN); Ravindranath Doddi, Hyderabad (IN); Ravi Kumar Sepuri, Hyderabad (IN)

(73) Assignee: Qualcomm Incorporated, San Diego, CA (US)

( * ) Notice: Subject to any disclaimer, the term of this patent is extended or adjusted under 35 U.S.C. 154(b) by 23 days.

(21) Appl. No.: 18/165,698

(22) Filed: Feb. 7, 2023

(65) Prior Publication Data

US 2024/0264965 A1 Aug. 8, 2024

(51) Int. Cl.
*G06F 13/40* (2006.01)
*G06F 13/42* (2006.01)

(52) U.S. Cl.
CPC ...... *G06F 13/4068* (2013.01); *G06F 13/4221* (2013.01); *G06F 2213/0026* (2013.01)

(58) Field of Classification Search
CPC ............. G06F 13/4068; G06F 13/4221; G06F 2213/0026
See application file for complete search history.

(56) References Cited

U.S. PATENT DOCUMENTS

| | | | | |
|---|---|---|---|---|
| 7,136,953 | B1 | 11/2006 | Bisson et al. | |
| 11,086,813 | B1 * | 8/2021 | Schuette | G06F 13/4022 |
| 11,424,905 | B1 * | 8/2022 | Musoll | G06F 13/4295 |
| 2010/0098104 | A1 * | 4/2010 | Marshall | H04L 49/3072 370/419 |
| 2012/0191921 | A1 * | 7/2012 | Shaeffer | G06F 13/4072 710/316 |
| 2014/0006670 | A1 * | 1/2014 | Wagh | G06F 13/4265 710/305 |
| 2014/0237142 | A1 * | 8/2014 | Jaussi | G06F 13/385 710/12 |
| 2015/0222705 | A1 * | 8/2015 | Stephens | G06F 3/067 709/214 |

(Continued)

OTHER PUBLICATIONS

International Search Report and Written Opinion—PCT/US2023/083136—ISA/EPO—Apr. 17, 2024 (2208059WO).

*Primary Examiner* — Henry Tsai
*Assistant Examiner* — Harry Z Wang
(74) *Attorney, Agent, or Firm* — NORTON ROSE FULBRIGHT US LLP

(57) ABSTRACT

This disclosure provides systems, methods, and devices for interconnecting components of an electronic device through a bus interface that supports dynamic link configuration for changing bandwidth requirements on a bus. In a first aspect, a method of communicating through a bus by a bus interface includes determining a transmit data rate and a receive data rate for a workload of the first device; transmitting a link configuration change request to a second device through the bus to reconfigure the link from a first link configuration to a second link configuration; and communicating over the bus based on the link configuration change. Other aspects and features are also claimed and described.

22 Claims, 6 Drawing Sheets

(56) References Cited

U.S. PATENT DOCUMENTS

| | | | | |
|---|---|---|---|---|
| 2015/0324268 | A1* | 11/2015 | Du | G06F 11/0745<br>714/43 |
| 2016/0283112 | A1* | 9/2016 | Blankenship | G06F 3/0604 |
| 2018/0329855 | A1* | 11/2018 | Das Sharma | H04L 69/24 |
| 2019/0042522 | A1* | 2/2019 | Peleska | H04W 52/02 |
| 2019/0042524 | A1* | 2/2019 | Das Sharma | G06F 13/4282 |
| 2019/0050365 | A1* | 2/2019 | Kopzon | G06F 13/4282 |
| 2019/0089624 | A1 | 3/2019 | Berchanskiy et al. | |
| 2019/0121417 | A1* | 4/2019 | Schneider | H04W 52/0229 |
| 2019/0250930 | A1* | 8/2019 | Erez | G06F 1/3281 |
| 2019/0286605 | A1* | 9/2019 | Harriman | G06F 13/387 |
| 2020/0301618 | A1* | 9/2020 | Olarig | G06F 3/067 |
| 2020/0371579 | A1* | 11/2020 | Selvam | G06F 1/3278 |

* cited by examiner

CHANNEL DIRECTION MANAGEMENT FOR BUS INTERFACES

TECHNICAL FIELD

Aspects of the present disclosure relate generally to computer information systems, and more particularly, to communications systems for coupling components of computer information systems. Some features may enable and provide improved bus or interconnect capabilities for reducing power consumption.

INTRODUCTION

Computer information systems may include many components including expansion circuit boards (such as mother and daughter cards), integrated circuit (IC) devices, and/or System-on-Chip (SoC) devices. The components may include processing circuits, user interface components, storage components, and/or other peripheral components. Communication between components may be implemented using a bus. The bus may be operated in compliance with standards-defined specifications and protocols. One example of such a specification-defined interface to a bus is the Peripheral Component Interconnect Express (PCIe) interface. PCIe provides a shared parallel bus architecture that supports interconnection of two devices using links that include one or more serial, full-duplex lanes.

The value and use of information by individuals continues to increase, as do computational requirements. Computational processes performed by computer information systems rely on busses to transmit interface components, so that each component may perform an assigned task. The tasks may include processing, compiling, storing, and/or communicating information for business, personal, or other purposes thereby allowing users to take advantage of the value of the information. Technology and information handling needs and requirements vary between different users and different applications and different computer information systems, such that there may be differences in how the information is handled, processed, stored, or communicated. The variations in information handling allow for computer information systems to be general or configured for a specific user or specific use, such as financial transaction processing, airline reservations, enterprise data storage, or global communications. The buses that interconnect components of computer information systems components are generally capable of supporting the use of the information to increase the value of the information but also provide specialized features to support certain operations or increase performance when performing certain tasks or kinds of information.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

Certain aspects of this disclosure relate to systems, apparatus, methods and techniques that provide dynamic bandwidth control by adjusting a directionality of wires within a lane for a PCIe bus interface or other bus interface in a computer information system, such as a mobile communication device. In some aspects, the direction of transmission over wires of a bus between a first component (e.g., a PCIe endpoint or PCIe root complex) and another component (e.g., a PCIe root complex or PCIe endpoint) may be negotiated to allow asymmetric connections.

Asymmetric connections involve an unequal number of wires for transmission and reception in the bus, such that the data rate achievable for one direction of transmission may be increased by reducing the data rate achievable for the other direction of transmission. The asymmetric configuration for lanes of the bus may be configured based on a configuration of a component communicating on the bus. For example, certain components may have workloads that have asymmetric data transfers, such as a graphics processing unit (GPU) that may input larger amounts of data (e.g., textures, geometric representations of scenes) but output smaller amounts of data (e.g., a rendered frame). The asymmetric configuration for lanes of the bus may be also or additionally be configured based on a workload of a component coupled to the bus. For example, a component with a large file to store in a storage device may have a large workload for transmission over the bus in one transfer direction during which only small acknowledgements are received from the storage device in the other transfer direction.

In some aspects, the bus interface may be implemented in battery-operated devices, including certain mobile communication devices. Mobile devices may be designed to meet increasingly tighter power consumption budgets in order to increase operating time while operating from a battery or other limited power supply. Aspects of this disclosure may be used in mobile communication devices to improve power efficiency or reduce power consumption when transmitting information between components coupled to a bus. As applications generate continuously-increasing demand for improved communication capabilities including higher data rates, lower data transmission latencies and improved battery conservation, there exists an ongoing need for improved power management that may be addressed by certain aspects of this disclosure.

The systems, apparatus, methods and techniques described herein may be incorporated into logic circuitry as a bus interface and built in an integrated circuit (IC) on a semiconductor die. The IC may be integrated into other components, such as a central processing unit (CPU) (including an applications processor), a graphics processing unit (GPU), a controller for a storage device (e.g., a universal flash storage (UFS) device or a multimedia memory card (MMC) device), a communications processor (e.g., a wireless modem for 3G, 4G LTE, 5G NR, Wi-Fi, Bluetooth, or a wireline transceiver for Ethernet).

The methods and techniques may also or alternatively be incorporated into instructions for storage as firmware or software in a computer readable medium, such as random access memory (RAM) or read-only memory (ROM). The instructions may be executed by the logic circuitry to cause a component executing the instructions to communicate over a bus through the bus interface.

An apparatus in accordance with at least one embodiment includes a bus interface configured to support communications between a first component coupled to a bus and a second component coupled to the bus. The bus interface may include logic configured to perform operations for formatting data and generating signals for transmission on the bus to convey the data along with control information and perform operations for processing signals received from the bus and extracting information from the signals. The bus interface may also include logic configured to perform operations to facilitate connections from the first component to the second component over the bus, such as by performing link training, link negotiation, link monitoring, and/or link adaptation.

In one aspect of the disclosure, a method for communicating on a bus through a bus interface includes transmitting a link configuration change request to a component through a bus to reconfigure the link from a first link configuration to a second link configuration, the second link configuration indicating at least one lane configuration indicating a bidirectional lane, a unidirectional transmit lane, or a unidirectional receive lane; and communicating over the bus based on the link configuration change.

In another aspect of the disclosure, a method for communicating on a bus through a bus interface includes receiving a link configuration change request from a component through a bus to reconfigure the link from a first link configuration to a second link configuration, the second link configuration indicating at least one lane configuration indicating a bidirectional lane, a unidirectional transmit lane, or a unidirectional receive lane; and communicating over the bus based on the link configuration change request.

In an additional aspect of the disclosure, an apparatus includes at least one processor and a memory coupled to the at least one processor. The at least one processor is configured to perform one or more operations of the methods, operations, and/or techniques described herein. The processor may be logic circuitry in a host component. The host component may be a component of a computer information system, such as an applications processor, a graphics processing unit (GPU), a controller of a storage device, a communications processor (e.g., a modem for 3G, 4G LTE, 5G NR, Wi-Fi, Bluetooth, or a wireline transceiver for Ethernet). The host component communicates over a bus in accordance with the method of communicating on a bus.

In an additional aspect of the disclosure, an apparatus includes means for performing one or more operations of the methods, operations, and/or techniques described herein. For example, an apparatus, such as a host component, may include a bus interface for communicating on the bus, in which the bus interface includes means for transmitting a link configuration change request to the component through the bus to reconfigure the link from a first link configuration to a second link configuration, the second link configuration indicating at least one lane configuration indicating a bidirectional lane, a unidirectional transmit lane, or a unidirectional receive lane, means for receiving a link configuration change request from the component through the bus to reconfigure the link from a first link configuration to a second link configuration, the second link configuration indicating at least one lane configuration indicating a bidirectional lane, a unidirectional transmit lane, or a unidirectional receive lane, and/or means for communicating over the bus based on the link configuration change request.

Other aspects, features, and implementations will become apparent to those of ordinary skill in the art, upon reviewing the following description of specific, exemplary aspects in conjunction with the accompanying figures. While features may be discussed relative to certain aspects and figures below, various aspects may include one or more of the advantageous features discussed herein. In other words, while one or more aspects may be discussed as having certain advantageous features, one or more of such features may also be used in accordance with the various aspects. In similar fashion, while exemplary aspects may be discussed below as device, system, or method aspects, the exemplary aspects may be implemented in various devices, systems, and methods.

The method may be embedded in a computer-readable medium as computer program code comprising instructions that cause a bus interface to perform the steps of the method. In some embodiments, the bus interface may be integrated with a processor that is part of a mobile device including a first network adaptor coupled to the processor through the bus interface with the first network adaptor configured to transmit data (e.g., images or videos in a previously-recorded file or as streaming data) over a first network connection of a plurality of network connections. The processor may be coupled to the first network adaptor and a memory for storing data through a common bus interface or multiple bus interfaces to support the processing and communications operations performed by the processor. The network adaptor may support communication over a wireless communications network such as a 5G NR communication network. The processor may cause the transmission of data by retrieving the data stored in memory over a bus interface, package the data for transmission on a selected network, and transmit the packaged data through the bus interface to the first network adaptor for transmission on the wireless communication network.

The foregoing has outlined, rather broadly, the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, aspects and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.).

While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations.

In some configurations, devices incorporating described aspects and features may also include additional components and features for implementation and practice of claimed and described aspects. For example, transmission and reception of wireless signals may includes a number of components for analog and digital purposes (e.g., hardware components including antenna, radio frequency (RF)-chains, power amplifiers, modulators, buffer, processor(s), interleaver, adders/summers, etc.). Innovations described herein may be practiced in a wide variety of devices, chip-level components, systems, distributed arrangements, end-user devices, etc. of varying sizes, shapes, and constitution.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Like reference numbers and designations in the various drawings indicate like elements.

DETAILED DESCRIPTION

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

The present disclosure provides systems, apparatus, methods, and computer-readable media that support data processing, including techniques for identifying data rate consumption of components coupled to a bus and determining a redistribution of the transmission and reception line pairs inside a link to accommodate different data rate requirements for transmission and reception.

Particular implementations of the subject matter described in this disclosure may be implemented to realize one or more of the following potential advantages or benefits. In some aspects, the present disclosure provides reduced power consumption by allowing the link configuration to accommodate a higher data in one direction. The higher data rate may decrease the amount of time used on the bus to complete an input/output (I/O) operation. A faster operation (completing in a shorter period of time) allows the link to return to a low power state quicker than conventionally possible with a fixed symmetric configuration of the link.

Figure 1:
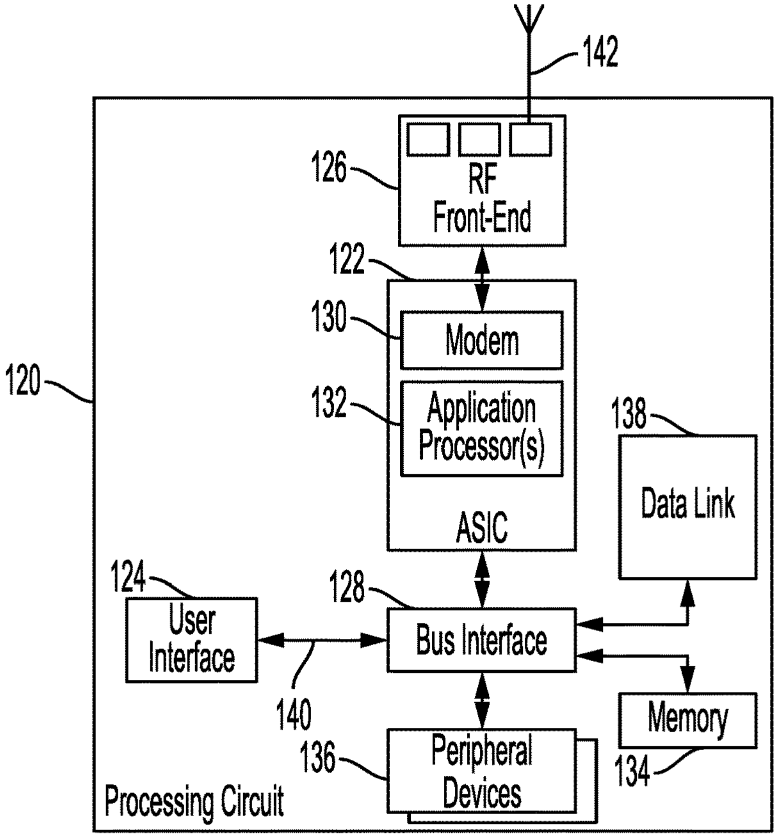
FIG. 1 is a block diagram of a computer information system that may be adapted according to one or more embodiments of the disclosure.

According to certain aspects, a bus interface, such as a PCIe bus interface, may be used to interconnect electronic devices that are subcomponents of an apparatus such as a cellular phone, a smart phone, a session initiation protocol (SIP) phone, a laptop, a notebook, a netbook, a smartbook, a personal digital assistant (PDA), a satellite radio, a global positioning system (GPS) device, a smart home device, intelligent lighting, a multimedia device, a video device, a digital audio player (e.g., MP3 player), a camera, a game console, an entertainment device, a vehicle component, a wearable computing device (e.g., a smart watch, a health or fitness tracker, eyewear, etc.), an appliance, a sensor, a security device, a vending machine, a smart meter, or any other similar functioning device. FIG. 1 depicts an example of such an apparatus 120. The apparatus 120 may include multiple devices or circuits 122, 124, 126, 128, 136, and/or 138. The apparatus 120 may be implemented in an application-specific IC (ASIC) or in a system on chip (SoC), either of which may include multiple devices or circuits 122, 124, 126, 128, 134, 136, and/or 138 as different components that may communicate with each other through busses. In one example, the apparatus 120 may be a communication device and may include a modem 130 that interfaces with a radio frequency (RF) front-end (RFFE) circuit 126 that enables the apparatus to communicate through one or more antennas 142 with a radio access network, a core access network, the Internet and/or another network.

The apparatus 120 includes an application-specific integrated circuit (ASIC) 122 that has one or more application processors 132 (e.g., a heterogenous mix of processors of different configurations, such as performance cores and efficiency cores), one or more modems 130 (e.g., baseband modems), and/or other logic circuits or functions. The apparatus 120 may be controlled by a basic input/output system (BIOS), firmware, and/or an operating system and may provide an application programming interface (API) layer that enables the one or more processors 132 to execute software modules residing in the memory device 134. The software modules may include instructions and data stored in a processor readable storage such as the memory device 134.

The ASIC 122 may access an internal memory, the memory device 134 (external to the ASIC 122), and/or storage devices included in peripheral devices 136 or storage devices outside the apparatus 120. Memory may include read-only memory (ROM) or random-access memory (RAM), electrically erasable programmable ROM (EEPROM), flash cards, or any memory device that can be used in processing systems and computing platforms. The ASIC 122 may include, or have access to, a local database or other parameter storage that maintains operational parameters and other information used to configure and operate the ASIC 122 and/or the apparatus 120. The local database may be implemented using registers, a database module, flash memory, magnetic media, EEPROM, optical media, tape, soft or hard disk, or the like. The apparatus 120 may also be operably coupled to external devices such as the antennas 142, a display, user interface 124 (e.g., a button, an integrated or external keypad, and/or a touch screen).

The apparatus 120 may communicate through a bus interface circuit 128, which may include a combination of fabrics, circuits, counters, timers, control logic and/or other configurable circuits or modules. In one example, the bus interface circuit 128 may be configured to operate in accordance with PCIe specifications and protocols. The apparatus 120 may include or control a power management function that configures and manages the bus interface 128, the user interface 124, the RF front-end circuit 126, and the operation of one or more application processors 132 resident in the ASIC 122. In certain modes of operation, the bus interface circuit 128 may be configured to transition between power states based on activity of the bus interface 128.

The bus interface 128 operates using one or more links. In an embodiment of apparatus 120 implementing a PCIe bus, the bus interface 128 may operate using high-speed serial links. The PCIe bus interface 128 may be characterized as having a point-to-point topology, with separate dual simplex point-to-point serial connections (e.g., link 140) connecting each device to a host, or root complex. The link 140 may have scalable link widths (e.g., ×1, ×2, ×4, ×8, ×16) and may have scalable link speeds (e.g., 2.5, 5.0, 8.0, 16.0 GT/s). The link 140 may be operated according to a packet-based transaction protocol and implement, optionally, data integrity and error handling, credit-based flow control, interrupt handling, and/or advanced power management. One or more transaction types may be supported by the link 140 including a memory read or memory write (used to transfer data to or from a memory-mapped location), a I/O read or I/O write (used to transfer data to or from an I/O location, such as a legacy endpoint), a configuration read or configuration write (used to discover device capabilities, features, and/or check a status of a component), or messaging (used to signal events or provide general purpose information).

Figure 2:
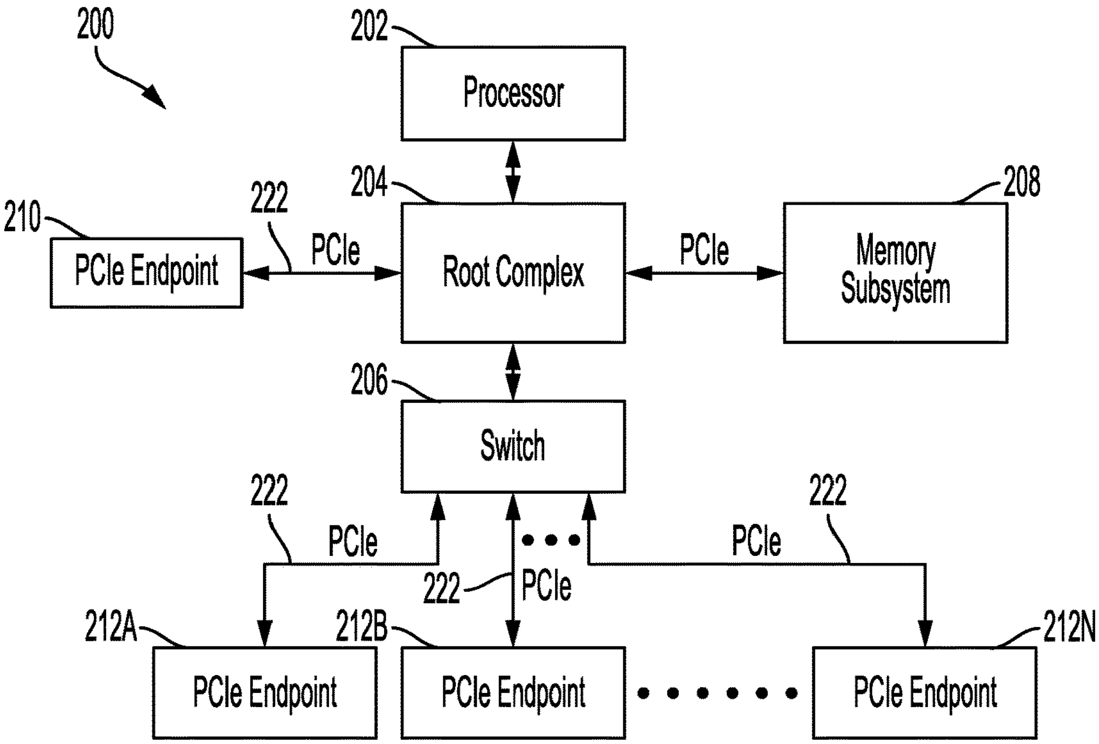
FIG. 2 is a block diagram of an architecture for a PCIe interface that may be adapted according to one or more embodiments of the disclosure.

FIG. 2 is a block diagram illustrating an example of an architecture for a PCIe interface 200. In the PCIe interface 200, the root complex (RC) 204 couples a processor 202 to memory devices (e.g., the memory subsystem 208) and a PCIe switch circuit 206. In some configurations, the switch circuit 206 includes cascaded switch devices. One or more PCIe endpoint devices (EDs) 210 may be coupled directly (e.g., without an intervening switch) to the root complex 204, and other PCIe endpoint devices 212A, 212B, . . . , 212N may be coupled to the root complex 204 through the PCIe switch circuit 206. The root complex 204 may be coupled to the processor 202 using a proprietary local bus interface or a standards-defined local bus interface. The root complex 204 may control operations of the PCIe interface 200 and may generate transaction requests for the processor 202. In some examples, the root complex 204 is implemented in the same IC device that includes the processor 202. A root complex 204 may support multiple PCIe ports.

The root complex 204 may control communication between the processor 202 the memory subsystem 208 and/or other PCIe endpoint devices 210, 212A, 212B, . . . , 212N. An endpoint device 210, 212A, 212B, . . . , 212N may be a device other than the root complex 204 that is capable of requesting or initiating a PCIe transaction or responding to (e.g., completing) a PCIe transaction. The root complex 204 may store a master copy of a Type 1 Configuration Table that defines a host memory space that is accessible from each endpoint device. Each PCIe endpoint may store a master copy of the endpoint's own memory space map in the host system memory as a Type 0 Configuration Table. Each device's configuration table allows the host to access the local memory of a PCIe device. The configuration tables may be setup by a host operating system that controls the root complex 204 by a process known as enumeration, which acts to build a device memory map for the system by querying each bridge and endpoint 210, 212A-N coupled to the bus network.

Information to be communicated using the PCIe interface 200 is encapsulated in packets in accordance with PCIe bus protocols. Devices coupled to a PCIe bus may communicate over links 222 using one or more PCIe lanes contained within the link. The number of lanes within each link 222 may be referred to as the width of the link. A PCIe lane may be defined as a point-to-point communication channel between two PCIe ports. A PCIe lane may provide full-duplex communication and may include two differentially encoded pairs of signaling wires or signal traces, with one pair of wires being used for transmitting data and the other pair of wires being used for receiving data. Packets may carry information in eight-bit bytes. In a multi-lane PCIe link, packet data may be striped across multiple lanes. The number of lanes in the multi-lane link may be negotiated during device initialization.

Each of the links 222 in the bus of FIG. 2 may be reconfigured during operation of the apparatus 122 to accommodate changes in bandwidth consumption by the endpoints 210, 212A-N, the root complex 204, the processor 202, and/or the memory subsystem 208. Each of the links 222 may include one or more lanes, with each lane comprising one or more wires. In an embodiment in which the bus is a PCIe bus, each of the lanes in the links 222 may include two pairs of wires configured for differential signaling. Conventionally, the two pairs of wires are configured for bidirectional operation, in which one pair of wires in the lane is for transmitting and one pair of wires in the lane is for receiving. According to aspects of this disclosure, the lanes may be reconfigured to change the direction of wires within the lanes, and thus change the bandwidth available in the transmit and receive directions on each of the links 222. The lane configuration may be changed during operation of the bus interface based on changing uses of the bus.

Figure 3A:
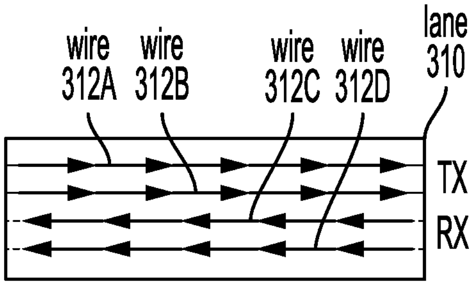
FIGS. 3A-3C are a block diagram illustrating various configurations for a lane of bus interface according to one or more embodiments of the disclosure.
Figure 3B:
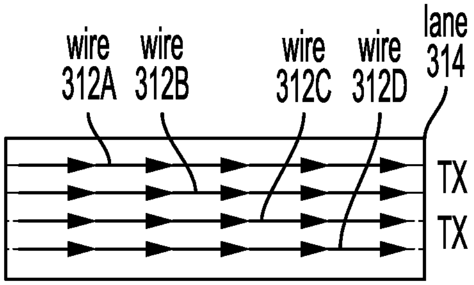
Figure 3C:
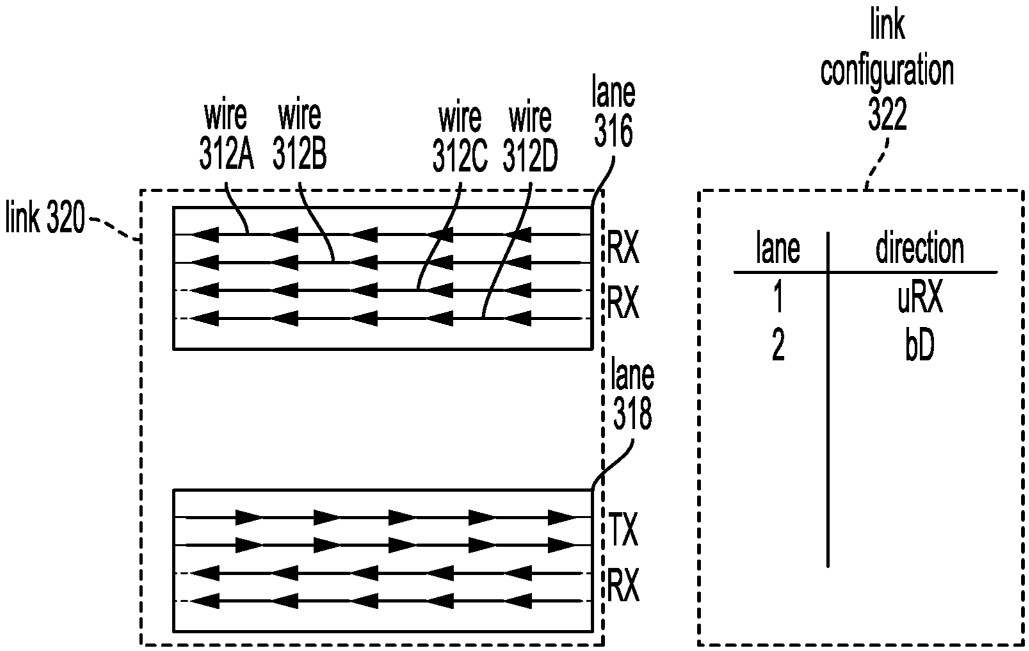

Example lane configurations for the links 222 are shown in FIGS. 3A, 3B, and 3C. Each lane may be configured into one of three configurations: a first lane configuration for bidirectional (bD) communication as shown in FIG. 3A, a second lane configuration for unidirectional transmit (uTx) as shown in FIG. 3B, or a third lane configuration for unidirectional receive (uRx) as shown in FIG. 3C. In FIG. 3A, lane 310 is configured for bidirectional communication with wires 312A-B configured for transmit and wires 312C-D configured for receive. In FIG. 3B, lane 314 is configured for unidirectional transmit with wires 312A-D configured for transmit. In FIG. 3C, lane 316 is configured for unidirectional receive with wires 312A-D configured for receive. The lane 316 of FIG. 3C is included in a link 320 along with another lane 318. The lane 318 in link 320 is configured for bidirectional communication.

A link configuration 322 for the link 320 may specify a direction for each of the lanes of the link 320. Example direction indicators may include a bidirectional lane (bD), a unidirectional transmit lane (uTx), or a unidirectional receive (uRx) lane. In some embodiments, the lane may include more than two pairs of wires and there may be more than 3 lane configurations for each lane.

A link may include more than two lanes, although only two lanes are shown in FIG. 3C. In some embodiments, a link configuration always includes at least one bidirectional lane, with the bidirectional lane used by the devices coupled to the link for at least control of the link 320 and, optionally, also for data (such as acknowledgements and negative acknowledgements).

Figure 4A:
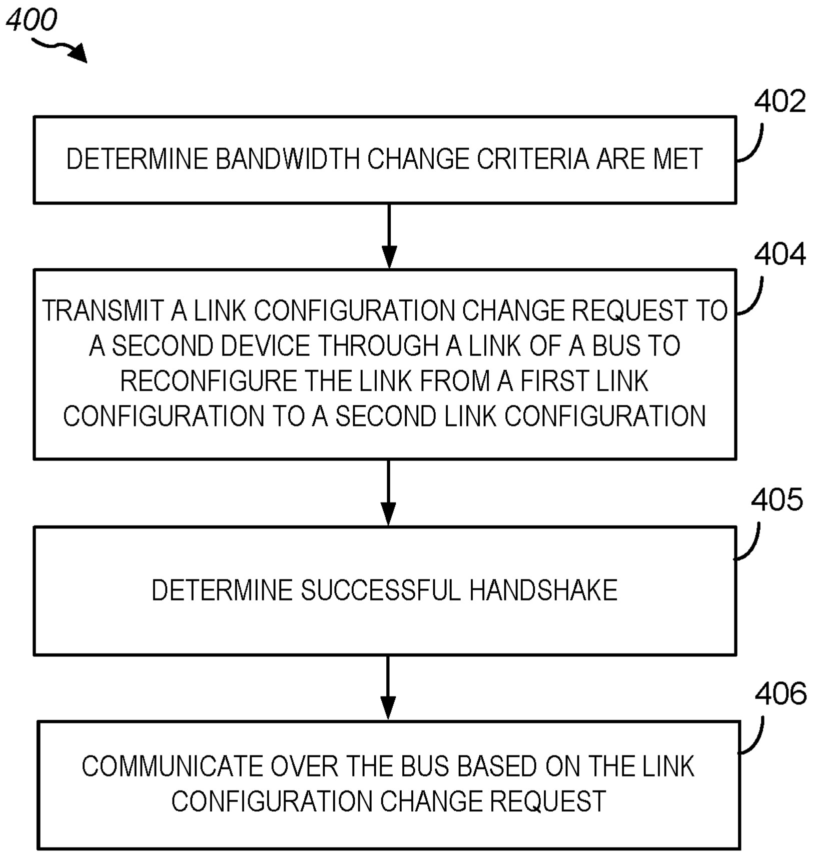
FIG. 4A is a flow chart illustrating an example method for controlling a link on a bus by a bus interface according to one or more aspects of the disclosure.

A method of reconfiguring a link to support different bandwidths for transmit and receive is shown in FIG. 4A. FIG. 4A is a flow chart illustrating an example method for controlling a link on a bus by a bus interface according to one or more aspects of the disclosure. A method 400 includes, at block 402, determining bandwidth change criteria are met. Algorithm(s) may monitor a change in data rate requirements of the first device and/or the second device coupled through the bus by the link. The change criteria may include one or more rules specifying when a change in bandwidth requirements should trigger a change in link configuration to support higher bandwidth requirements.

One example algorithm is to monitor a fill level of a buffer for the link, in which a bandwidth change criteria is satisfied when the fill level exceeds a threshold level or exceeds a threshold level for a predetermined amount of time. Another example algorithm is to receive hints from a higher level, such as through an application programming interface (API), indicating a change in an upcoming change in bandwidth demands. A further example algorithm is to monitor an average transmission rate and if the transmission rate meets a threshold level for a predetermined period of time then bandwidth change criteria are satisfied.

At block 404, the method 400 includes a first, transmitting device coupled to the bus transmitting a link configuration change request to a second, receiving device through the bus to reconfigure the link from a first link configuration to a second link configuration. The configuration change request may be based on certain criteria being satisfied in block 402. In some embodiments, multiple criteria may be specified for the determination of block 402 and each criteria may also specify a resulting link configuration to apply at block 404. The determination of bandwidth change criteria may include monitoring the utilization of bandwidth for transmit and/or receive during operation of the link at the first link configuration. For example, the bandwidth may be monitored to determine that the transmit lanes are more than a threshold level (e.g., 80%) utilized.

The link configuration change request of block 404 may indicate a new configuration for the lanes in the link. The link configuration change request may include a link configuration value that indicates a second link configuration for the bus to reconfigure to from its current, first link configuration. The link configuration value may indicate a lane configuration specifying, for each lane, a bidirectional lane, a unidirectional transmit lane, or a unidirectional receive lane. In some embodiments, the link configuration value may be a single value that corresponds to a predetermined lane configuration. For example, a value of 1 may correspond to link configuration 322 shown in FIG. 3C with lane 1 in universal receive and lane 2 in bidirectional. A value of 2 may correspond to lane 1 in universal transmit and lane 2 in bidirectional. A value of 3 may correspond to lane 1 in bidirectional and lane 2 in bidirectional. The enumerated predetermined lane configurations may be specified in a look-up table, which may be fixed for all devices or negotiated between devices during an initial connection setup. In some embodiments, the link configuration value may be a set of values corresponding to the number of lanes, with each value indicating a lane configuration. For example, a two-lane bus may have a link configuration value with two entries with each entry indicating a direction (e.g., 0 indicating unidirectional, 1 indicating universal transmit, 2 indicating universal receive). The link configuration value may alternatively indicate weights corresponding to a percentage or number of each type of lane (e.g., bidirectional, unidirectional transmit, unidirectional receive) and an agreed-upon method used to configure the available lanes using the weights. For example, the link configuration value may be (0.2, 0, 0.8) indicating 20% bidirectional, 0% universal receive, 80% universal transmit). As another example, the link configuration value may be (1, 0, 2) indicating 1 bidirectional lane, 0 universal receive lanes, and 2 universal transmit lanes. The second link configuration may be different from the first link configuration, with the second link configuration determined based on a new bandwidth indicated by the monitoring of block 402. For example, when the transmit utilization exceeds the threshold, the second link configuration may be selected to include a higher transmit bandwidth by designating more lanes as universal transmit lanes.

A handshake process at block 405 may follow the initiation of a configuration change of block 404. One example handshake process may include link recovery and configuration operations on the bus. When the handshake process completes successfully, the method 400 may continue to block 406.

At block 406, the method 400 includes a first device communicating over the bus based on the link configuration change. If the second link configuration increases a number of wires available for transmission then the communication at block 406 may increase a data rate of transmission. If the second link configuration increases a number of wires available for receiving then the communication at block 406 may increase a data rate of receiving. After a transaction is completed at the link configuration, the link may be switched to a low-power state to reduce power consumption.

Figure 4B:
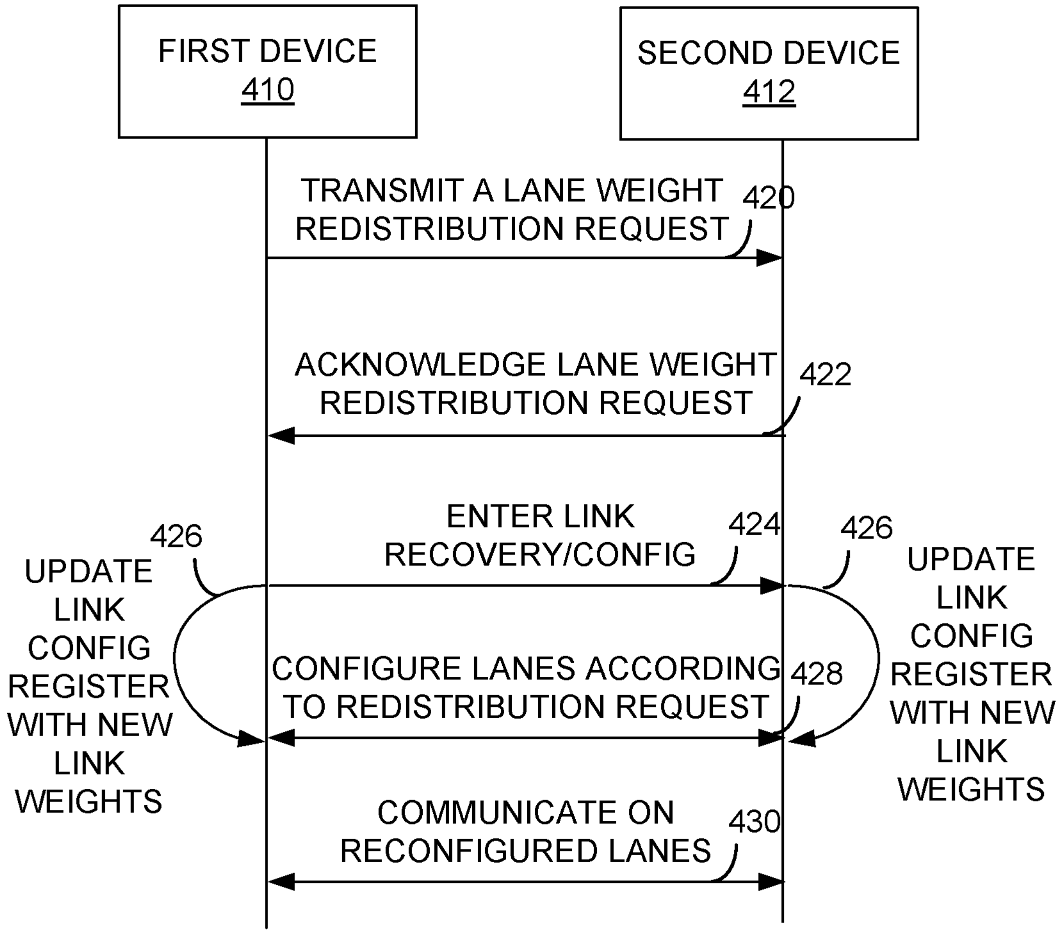
FIG. 4B is a call flow diagram illustrating a link reconfiguration according to one or more aspects of the disclosure.

An example reconfiguration operation for a link is shown in FIG. 4B. FIG. 4B is a call flow diagram illustrating a link reconfiguration according to one or more aspects of the disclosure. A call flow between a first device 410 (e.g., a PCIe endpoint (ED) or PCIe root complex (RC)) and a second device 412 (e.g., a PCIe endpoint (ED) or PCIe root complex (RC)) communicating over a PCIe link is illustrated in FIG. 4B.

The first device 410 may be a requestor device and may transmit a lane weight redistribution request 420 to the second device 412, which may be a completer device. The second device 412 may acknowledge 422 the lane weight redistribution request 420, after which the link between the first device 410 and the second device 412 enters into a recovery/configuration path 424. The lanes may be reconfigured between the three types of bidirectional, unidirectional transmit, and unidirectional receive, according to weights in a configuration state of the link.

One example reconfiguration may be performed in a link configuration state controlled by a Link Training and Status State Machine (LTSSM) for a PCIe bus interface to bring up an appropriate number of lanes according to the link configuration of block 404. The LTSSM may define several top-level states including Detect, Polling, Configuration, Recovery, L0, L0s, L1, L2, Hot Reset, Loopback and Disable. These top-level states may be grouped into five categories: Link Training states, Re-Training (Recovery) state, Software driven Power Management states, Active-State Power Management states, and Other states. The flow of the LTSSM follows the Link Training states when exiting from a Reset (e.g., from Detect to Polling to Configuration to L0). In the L0 state, normal packet transmission/reception may proceed. The Recovery State may be used for a variety of reasons, such as changing back from a low-power Link state, such as L1, or changing the link Bandwidth.

During this recovery state the directions of lanes may be reconfigured 428 and, optionally, the training performed for the lanes. In some embodiments, the lane weights are communicated as part of the redistribution request 420 and used to update a configuration register 426 within the bus interface at each of the first device 410 and the second device 412. In some embodiments, the lane weights are communicated in a message subsequent to the redistribution request 420 and used to update a configuration register within the bus interface.

In some embodiments, a register in the bus interface includes a reserved 8-bit configuration register to configure the weights (e.g., C0, C1, and C2 corresponding to bD, uTx, and uRx, respectively) for the link. There are $2^{n-1}$ possible configurations, thus with $n_{max}=32$, $(2^{n-1})_{max}=63$, which can be represented through 6 bits. An example configuration register for the weights may be defined according to the following table:

| Lane Configuration Register | |
|---|---|
| Bits | Contents |
| [5:0] | Lane weights of the link |
| [7:6] | Reserved |

Also, in this configuration state, the link repeats as much of the training process as needed to configure and returns to the L0 state. Power management software may also place a device into a low-power device state forcing the link into a lower Power Management Link state (e.g., L1 or L2). If there are no packets to send for a predetermined time, period power management software may be allowed to transition the link into low power ASPM states (e.g., L0 or ASPM L1). In addition, software may direct a link to enter another special state (e.g., Disabled, Loopback, Hot Reset)

After the link is reconfigured 428, communications may continue on the reconfigured lanes 430. The reconfiguration may allow, for example, a large read operation to a storage device to reconfigure additional lanes or substantially all (e.g., all except one reserved for bidirectional) lanes for unidirectional receive to increase the data rate and thus reduce the transfer time.

In some embodiments, the link reconfiguration may include changing a data rate or other signaling aspect of one or more lanes. For example, a PCIe link may be reconfigured between different generations of signaling to achieve higher or lower data rates. For example, a link may be reconfigured between Gen1 (2.5 GT/s), Gen 2 (5 GT/s), Gen3 (8 GT/s), and Gen4 (16 GT/s). In some embodiments, individual lanes may be reconfigured to a different generation or control other signaling characteristics of the link.

An example reconfiguration of a PCIe link with four lanes between two endpoints operating at Gen1 (which supports 250 MB/s per wire pair) is shown in the table below:

| Case | Number of Transmit Lanes | Transmit BW at Gen1 (MB/s) | Number of Receive Lanes | Receive BW at Gen1 (MB/s) |
|---|---|---|---|---|
| 1 | 1 | 250 | 7 | 1750 |
| 2 | 2 | 500 | 6 | 1500 |
| 3 | 3 | 750 | 5 | 1250 |
| 4 | 4 | 1000 | 4 | 1000 |

-continued

| Case | Number of Transmit Lanes | Transmit BW at Gen1 (MB/s) | Number of Receive Lanes | Receive BW at Gen1 (MB/s) |
|---|---|---|---|---|
| 5 | 5 | 1250 | 3 | 750 |
| 6 | 6 | 1500 | 2 | 500 |
| 7 | 7 | 1750 | 1 | 250 |

Conventionally, a PCIe link only supports case 4 in which all lanes are bidirectional, resulting in a symmetric link configuration. According to aspects of this disclosure, different numbers of lanes may be allocated for different directions of transfer, which provides flexibility in the bus configuration to support a variety of different devices that may be present in an electronic device, such as a mobile communication device that performs many different functions. As described in the example above, reconfiguring the bus for data transfer to a storage device may be useful when a large data file is queued for reading or writing to the storage device to decrease the amount of time the link is out of low-power state to perform the transfer. As another example, a network interface, such as a wireless modem, may have changing bandwidth requirements, such as when a large file is transmitted to a cloud server (which involves a large transmit operation from memory to the modem) or when a video is downloaded from the Internet (which involves a large receive operation from the modem to the storage device).

Figure 5:
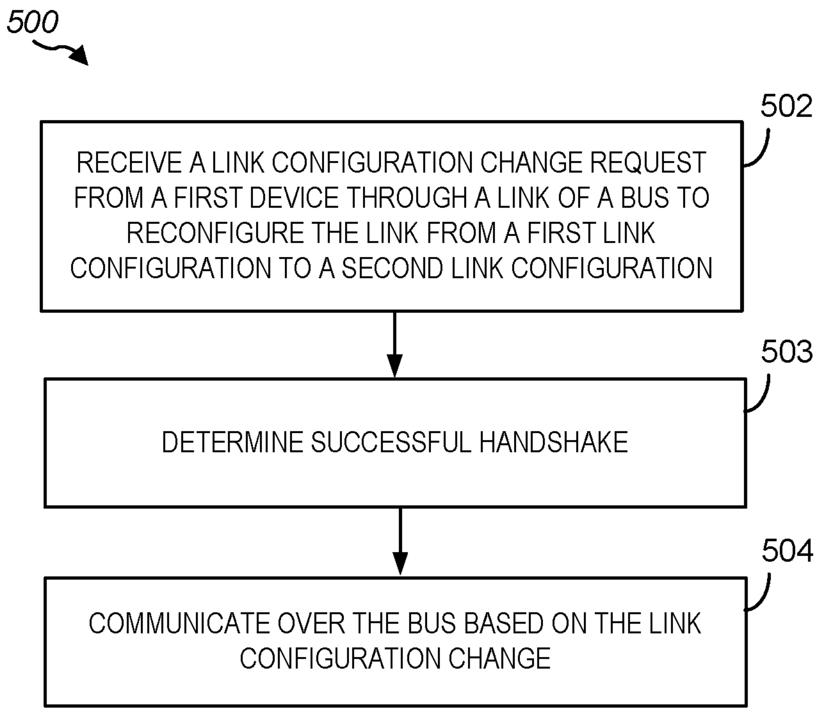
FIG. 5 is a flow chart illustrating an example method for controlling a link on a bus by a bus interface according to one or more aspects of the disclosure.

A similar operation may be performed by the second device, or receiving device, coupled to the first device through the bus. FIG. 5 is a flow chart illustrating an example method for controlling a link on a bus by a bus interface according to one or more aspects of the disclosure. A method 500 includes, at block 502, receiving a link configuration change request from a first device through a link of a bus to reconfigure the link from a first link configuration to a second link configuration. A handshake process at block 503 may follow the initiation of a configuration change received at block 502. One example handshake process may include link recovery and configuration operations on the bus. When the handshake process completes successfully, the method 500 may continue to block 506.

At block 504, the second, receiving device, communicates over the bus based on the link configuration change.

Figure 6:
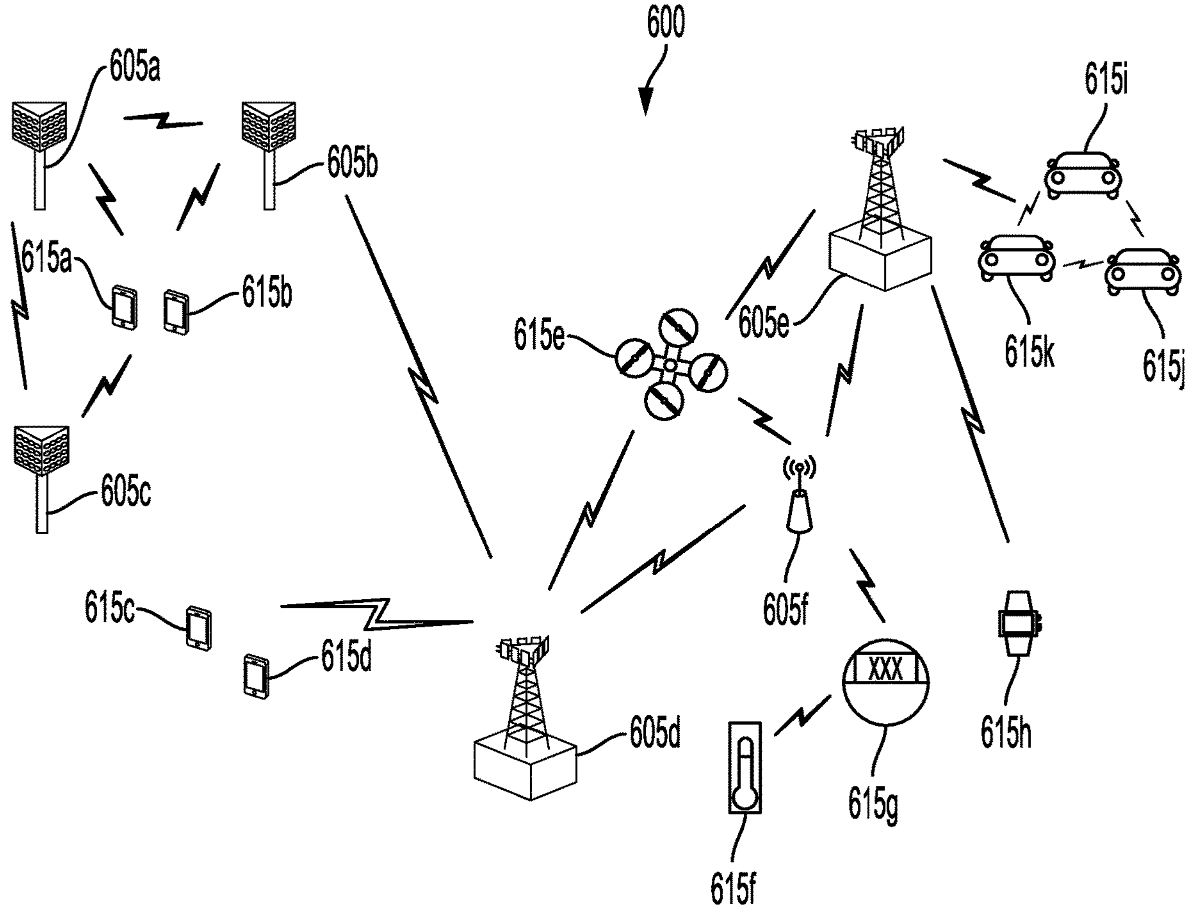
FIG. 6 is a block diagram illustrating details of an example wireless communication system according to one or more aspects.

Operations of methods 400 or 500 may be performed by a user equipment (UE), a base station (BS), other communications device, or other computer information system, such as any of the devices described with reference to FIG. 6. For example, example operations (also referred to as "blocks") of method 400 or 500 may enable UE 115 to support greater data transfer rates at lower power consumption while communicating over high-speed communications networks. FIG. 6 is a block diagram illustrating details of an example wireless communication system according to one or more aspects. The wireless communication system may include wireless network 600. Wireless network 600 may, for example, include a 5G wireless network. As appreciated by those skilled in the art, components appearing in FIG. 6 are likely to have related counterparts in other network arrangements including, for example, cellular-style network arrangements and non-cellular-style-network arrangements (e.g., device to device or peer to peer or ad hoc network arrangements, etc.).

Wireless network 600 illustrated in FIG. 6 includes a number of base stations 605 and other network entities. A base station may be a station that communicates with the UEs and may also be referred to as an evolved node B (eNB), a next generation eNB (gNB), an access point, and the like. Each base station 605 may provide communication coverage for a particular geographic area. In 3GPP, the term "cell" may refer to this particular geographic coverage area of a base station or a base station subsystem serving the coverage area, depending on the context in which the term is used. In implementations of wireless network 600 herein, base stations 605 may be associated with a same operator or different operators (e.g., wireless network 600 may include a plurality of operator wireless networks). Additionally, in implementations of wireless network 600 herein, base station 605 may provide wireless communications using one or more of the same frequencies (e.g., one or more frequency bands in licensed spectrum, unlicensed spectrum, or a combination thereof) as a neighboring cell. In some examples, an individual base station 605 or UE 615 may be operated by more than one network operating entity. In some other examples, each base station 605 and UE 615 may be operated by a single network operating entity.

A base station may provide communication coverage for a macro cell or a small cell, such as a pico cell or a femto cell, or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 6, base stations **605*d* and 605*e* are regular macro base stations, while base stations 605*a*-605*c* are macro base stations enabled with one of 3 dimension (3D), full dimension (FD), or massive MIMO. Base stations 605*a*-605*c* take advantage of their higher dimension MIMO capabilities to exploit 3D beamforming in both elevation and azimuth beamforming to increase coverage and capacity. Base station 605*f*** is a small cell base station which may be a home node or portable access point. A base station may support one or multiple (e.g., two, three, four, and the like) cells.

Wireless network 600 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 615 are dispersed throughout the wireless network 600, and each UE may be stationary or mobile. It should be appreciated that, although a mobile apparatus is commonly referred to as a UE in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component, vehicular device, or vehicular module, or some other suitable terminology. Within the present document, a "mobile" apparatus or UE need not necessarily have a capability to move, and may be stationary. Some non-limiting examples of a mobile apparatus, such as may include implementations of one or more of UEs 615, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an IoT or "Internet of everything" (IoE) device such as an automotive or other transportation vehicle, a satellite radio, a global positioning system (GPS) device, a global navigation satellite system (GNSS) device, a logistics controller, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs **615*a*-615*d* of the implementation illustrated in FIG. A are examples of mobile smart phone-type devices accessing wireless network 600. A UE may also be a machine specifically configured for connected communication, including machine type communication (MTC), enhanced MTC (eMTC), narrowband IoT (NB-IoT) and the like. UEs 615*e*-615*k* illustrated in FIG. 6 are examples of various machines configured for communication that access wireless network 600**.

A mobile apparatus, such as UEs 615, may be able to communicate with any type of the base stations, whether macro base stations, pico base stations, femto base stations, relays, and the like. In FIG. A, a communication link (represented as a lightning bolt) indicates wireless transmissions between a UE and a serving base station, which is a base station designated to serve the UE on the downlink or uplink, or desired transmission between base stations, and backhaul transmissions between base stations. UEs may operate as base stations or other network nodes in some scenarios. Backhaul communication between base stations of wireless network 600 may occur using wired or wireless communication links.

In operation at wireless network 600, base stations **605*a*-605*c* serve UEs 615*a* and 615*b* using 3D beamforming and coordinated spatial techniques, such as coordinated multipoint (CoMP) or multi-connectivity. Macro base station 605*d* performs backhaul communications with base stations 605*a*-605*c*, as well as small cell, base station 605*f*. Macro base station 605*d* also transmits multicast services which are subscribed to and received by UEs 615***c* and 615*d*. Such multicast services may include mobile television or stream video, or may include other services for providing community information, such as weather emergencies or alerts, such as Amber alerts or gray alerts.

Wireless network 600 of implementations supports mission critical communications with ultra-reliable and redundant links for mission critical devices, such UE 615*e*, which is a flying device. Redundant communication links with UE 615*e* include from macro base stations 605*d* and 605*e*, as well as small cell base station 605*f*. Other machine type devices, such as UE 615*f* (thermometer), UE 615*g* (smart meter), and UE 615*h* (wearable device) may communicate through wireless network 600 either directly with base stations, such as small cell base station 605*f*, and macro base station 605*e*, or in multi-hop configurations by communicating with another user device which relays its information to the network, such as UE 615*f* communicating temperature measurement information to the smart meter, UE 615*g*, which is then reported to the network through small cell base station 605*f*. Wireless network 600 may also provide additional network efficiency through dynamic, low-latency TDD communications or low-latency FDD communications, such as in a vehicle-to-vehicle (V2V) mesh network between UEs 615*i*-615*k* communicating with macro base station 605*e*.

In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks (sometimes referred to as "5G NR" networks, systems, or devices), as well as other communications networks. As described herein, the terms "networks" and "systems" may be used interchangeably. A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards. A TDMA network may, for example implement a radio technology such as Global System for Mobile Communication (GSM). The 3rd Generation Partnership Project (3GPP) defines standards for the GSM EDGE (enhanced data rates for GSM evolution) radio access network (RAN), also denoted as GERAN. An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long-term evolution (LTE) is a release of UMTS that uses E-UTRA. The various different network types may use different radio access technologies (RATs) and RANs.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, implementations or uses may come about via integrated chip implementations or other non-module-component based devices (e.g., end-user devices, vehicles, communication devices, computing devices, industrial equipment, retail devices or purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or original equipment manufacturer (OEM) devices or systems incorporating one or more described aspects. In some practical settings, devices incorporating described aspects and features may also necessarily include additional components and features for implementation and practice of claimed and described aspects. It is intended that innovations described herein may be practiced in a wide variety of implementations, including both large devices or small devices, chip-level components, multi-component systems (e.g., radio frequency (RF)-chain, communication interface, processor), distributed arrangements, end-user devices, etc. of varying sizes, shapes, and constitution.

In one or more aspects, techniques for supporting data transfer through a bus, may include additional aspects, such as any single aspect or any combination of aspects described below or in connection with one or more other processes or devices described elsewhere herein. In various aspects listed below, an electronic device, such as a UE or BS, may be an apparatus that includes a bus configured to couple components of the electronic device, in which a bus interface is provided to facilitate communications on the bus by the components.

In a first aspect, the bus interface may be configured to perform operations including transmitting a link configuration change request to a component through a bus to reconfigure the link from a first link configuration to a second link configuration, the second link configuration indicating at least one lane configuration indicating a bidirectional lane, a unidirectional transmit lane, or a unidirectional receive lane; and communicating over the bus based on the link configuration change.

In a second aspect, in combination with the first aspect, the second link configuration indicates a plurality of lane configurations, each of the plurality of lane configurations corresponding to a lane of the link.

In a third aspect, in combination with one or more of the first aspect or the second aspect, at least one lane configuration of the first link configuration is bidirectional and at least one lane configuration of the second link configuration is bidirectional.

In a fourth aspect, in combination with one or more of the first aspect through the third aspect, the link configuration change request includes a first value indicating a first number of lanes of the link configured as a bidirectional lane, a second value indicating a second number of lanes of the link configured as a unidirectional transmit lane, and a third value indicating a third number of lanes of the link configured as a unidirectional receive lane.

In a fifth aspect, in combination with one or more of the first aspect through the fourth aspect, the method may further include determining a characteristic for a workload of the component, wherein the characteristic indicates at least one of a transmit data rate and a receive data rate on the bus, wherein the link configuration change request is based on the characteristic for the workload.

In a sixth aspect, in combination with one or more of the first aspect through the fifth aspect, transmitting the link configuration change request comprises transmitting a lane weight redistribution request to the component, receiving an acknowledge of the lane weight redistribution request from the component, and reconfiguring the link with a new lane weight distribution according to the second link configuration, wherein the communicating over the bus based on the link configuration change is after the reconfiguring the link.

In a seventh aspect, in combination with one or more of the first aspect through the sixth aspect, the second link configuration indicates a data rate for each lane of the at least one lane configuration.

In an eighth aspect, in combination with one or more of the first aspect through the seventh aspect, storing a value corresponding to a link configuration for the link in a register.

In a ninth aspect, in combination with one or more of the first aspect through the eighth aspect, the transmitting is performed by a bus interface comprising a peripheral component interconnect express (PCIe) interface.

In a tenth aspect, in combination with one or more of the first aspect through the ninth aspect, the component comprises a PCIe endpoint or a PCIe root complex.

In an eleventh aspect, in combination with one or more of the first aspect through the tenth aspect, a method includes receiving a link configuration change request from a component through a bus to reconfigure the link from a first link configuration to a second link configuration, the second link configuration indicating at least one lane configuration indicating a bidirectional lane, a unidirectional transmit lane, or a unidirectional receive lane; and communicating over the bus based on the link configuration change request.

In a twelfth aspect, in combination with one or more of the first aspect through the eleventh aspect, the second link configuration indicates a plurality of lane configurations, each of the plurality of lane configurations corresponding to a lane of the link.

In a thirteenth aspect, in combination with one or more of the first aspect through the twelfth aspect, at least one lane configuration of the first link configuration is bidirectional and at least one lane configuration of the second link configuration is bidirectional.

In a fourteenth aspect, in combination with one or more of the first aspect through the thirteenth aspect, the link configuration change request includes a first value indicating a first number of lanes of the link configured as a bidirectional lane, a second value indicating a second number of lanes of the link configured as a unidirectional transmit lane, and a third value indicating a third number of lanes of the link configured as a unidirectional receive lane.

In a fifteenth aspect, in combination with one or more of the first aspect through the fourteenth aspect, the receiving is performed by a bus interface comprising a register configured to store a value corresponding to a link configuration for the link, the bus interface comprises a peripheral component interconnect express (PCIe) interface, and the component comprises a PCIe endpoint or a PCIe root complex.

In the description of embodiments herein, numerous specific details are set forth, such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the present disclosure. However, it will be apparent to one skilled in the art that these specific details may not be required to practice the teachings disclosed herein. In other instances, well known circuits and devices are shown in block diagram form to avoid obscuring teachings of the present disclosure.

Some portions of the detailed descriptions which follow are presented in terms of procedures, logic blocks, processing, and other symbolic representations of operations on data bits within a computer memory. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

In the figures, a single block may be described as performing a function or functions. The function or functions performed by that block may be performed in a single component or across multiple components, and/or may be performed using hardware, software, or a combination of hardware and software. To clearly illustrate this interchangeability of hardware and software, various illustrative components, blocks, modules, circuits, and steps are described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example devices may include components other than those shown, including well-known components such as a processor, memory, and the like.

Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving," "settling," "generating," or the like, refer to the actions and processes of a computer system, or similar electronic computing device, that manipulates and transforms data represented as physical (electronic) quantities within the computer system's registers and memories into other data similarly represented as physical quantities within the computer system's registers, memories, or other such information storage, transmission, or display devices.

The terms "device" and "apparatus" are not limited to one or a specific number of physical objects (such as one smartphone, one camera controller, one processing system, and so on). As used herein, a device may be any electronic device with one or more parts that may implement at least some portions of the disclosure. While the description and examples herein use the term "device" to describe various aspects of the disclosure, the term "device" is not limited to a specific configuration, type, or number of objects. As used herein, an apparatus may include a device or a portion of the device for performing the described operations.

Certain components in a device or apparatus described as "means for accessing," "means for receiving," "means for sending," "means for using," "means for selecting," "means for determining," "means for normalizing," "means for multiplying," or other similarly-named terms referring to one or more operations on data, such as image data, may refer to processing circuitry (e.g., application specific integrated circuits (ASICs), digital signal processors (DSP), graphics processing unit (GPU), central processing unit (CPU)) configured to perform the recited function through hardware, software, or a combination of hardware configured by software.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-2 include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, application, software applications, software packages, routines, subroutines, objects, executables, threads of execution, procedures, and/or functions, among other examples, whether referred to as software, firmware, middleware, microcode, hardware description language or otherwise. In addition, features discussed herein may be implemented via specialized processor circuitry, via executable instructions, or combinations thereof.

Those of skill in the art that one or more blocks (or operations) described with reference to FIG. 1, 2, or 6 may be combined with one or more blocks (or operations) described with reference to another of the figures. For example, one or more blocks (or operations) of FIG. 4A, 4B, or 5 may be combined with one or more blocks (or operations) of FIG. 1 or 2. As another example, one or more blocks associated with FIG. 54A, 4B, or 5 may be combined with one or more blocks (or operations) associated with FIG. 6.

Those of skill in the art would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits, and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, or any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, which is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein but are to be accorded the widest scope consistent with this disclosure, the principles and the novel features disclosed herein.

Additionally, a person having ordinary skill in the art will readily appreciate, opposing terms such as "upper" and "lower," or "front" and back," or "top" and "bottom," or "forward" and "backward" are sometimes used for ease of describing the figures, and indicate relative positions corresponding to the orientation of the figure on a properly oriented page, and may not reflect the proper orientation of any device as implemented.

As used herein, the term "coupled to" in the various tenses of the verb "couple" may mean that element A is directly connected to element B or that other elements may be connected between elements A and B (i.e., that element A is indirectly connected with element B), to operate certain intended functions. In the case of electrical components, the term "coupled to" may also be used herein to mean that a wire, trace, or other electrically conductive material is used to electrically connect elements A and B (and any components electrically connected therebetween). In some examples, the term "coupled to" mean a transfer of electrical energy between elements A and B, to operate certain intended functions.

In some examples, the term "electrically connected" mean having an electric current or configurable to having an electric current flowing between the elements A and B. For example, the elements A and B may be connected via resistors, transistors, or an inductor, in addition to a wire, trace, or other electrically conductive material and components. Furthermore, for radio frequency functions, the elements A and B may be "electrically connected" via a capacitor.

The terms "first," "second," "third," etc. are employed for ease of reference and may not carry substantive meanings. Likewise, names for components/modules may be adopted for ease of reference and might not limit the components/modules. \

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown, or in sequential order, or that all illustrated operations be performed to achieve desirable results. Further, the drawings may schematically depict one or more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof.

The term "substantially" is defined as largely, but not necessarily wholly, what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. An apparatus, comprising:

a bus interface configured to couple the apparatus to a component through a link and configured to perform operations comprising:

transmitting a link configuration change request to the component through the bus interface to reconfigure the link from a first link configuration to a second link configuration, wherein the link configuration change request includes a first value indicating a first number of lanes of the link configured as a bidirectional lane, a second value indicating a second number of lanes of the link configured as a unidirectional transmit lane, and a third value indicating a third number of lanes of the link configured as a unidirectional receive lane, wherein the second link configuration indicates a lane configuration and a generation of signaling for each lane of at least two lanes of the link, including a first lane having a first generation of signaling and a second lane having a second generation of signaling that is different than the first generation of signaling, and wherein the lane configuration indicates a bidirectional lane, a unidirectional transmit lane, or a unidirectional receive lane; and communicating over the bus interface based on the link configuration change request.

2. The apparatus of claim 1, wherein at least one lane configuration of the first link configuration is bidirectional and at least one lane configuration of the second link configuration is bidirectional.

3. The apparatus of claim 1, wherein the bus interface is configured to perform further operations comprising:
determining a characteristic for a workload of the component, wherein the characteristic indicates at least one of a transmit data rate and a receive data rate on the link, and
wherein the link configuration change request is based on the characteristic for the workload.

4. The apparatus of claim 1, wherein:
transmitting the link configuration change request comprises:
transmitting a lane weight redistribution request to the component;
receiving an acknowledge of the lane weight redistribution request from the component; and
reconfiguring the link with a new lane weight distribution according to the second link configuration, and
the communicating over the link based on the link configuration change request is after the reconfiguring the link.

5. The apparatus of claim 1, wherein the second link configuration indicates a data rate for each lane of the at least two lanes of the link.

6. The apparatus of claim 1, wherein the bus interface comprises a register configured to store a value corresponding to a link configuration for the link.

7. The apparatus of claim 1, wherein the bus interface comprises a peripheral component interconnect express (PCIe) interface, and the generation of signaling for each lane of the at least two lanes of the link comprises a generation of the peripheral component interconnect express (PCIe) interface.

8. The apparatus of claim 7, wherein the apparatus comprises a PCIe endpoint or a PCIe root complex, and the component comprises a PCIe endpoint or a PCIe root complex.

9. A method, comprising:
transmitting a link configuration change request to a component through a bus to reconfigure a link from a first link configuration to a second link configuration, wherein the link configuration change request includes a first value indicating a first number of lanes of the link configured as a bidirectional lane, a second value indicating a second number of lanes of the link configured as a unidirectional transmit lane, and a third value indicating a third number of lanes of the link configured as a unidirectional receive lane,
wherein the second link configuration indicates a lane configuration and a generation of signaling for each lane of at least two lanes of the link, including a first lane having a first generation of signaling and a second lane having a second generation of signaling that is different than the first generation of signaling, and
wherein the lane configuration indicates a bidirectional lane, a unidirectional transmit lane, or a unidirectional receive lane; and
communicating over the bus based on the link configuration change request.

10. The method of claim 9, wherein at least one lane configuration of the first link configuration is bidirectional and at least one lane configuration of the second link configuration is bidirectional.

11. The method of claim 9, further comprising:
determining a characteristic for a workload of the component, wherein the characteristic indicates at least one of a transmit data rate and a receive data rate on the bus, and
wherein the link configuration change request is based on the characteristic for the workload.

12. The method of claim 9, wherein:
transmitting the link configuration change request comprises:
transmitting a lane weight redistribution request to the component;
receiving an acknowledge of the lane weight redistribution request from the component; and
reconfiguring the link with a new lane weight distribution according to the second link configuration, and
the communicating over the bus based on the link configuration change request is after the reconfiguring the link.

13. The method of claim 9, wherein the second link configuration indicates a data rate for each lane of the at least two lanes of the link.

14. The method of claim 9, further comprising storing a value corresponding to a link configuration for the link in a register.

15. The method of claim 9, wherein the transmitting is performed by a bus interface comprising a peripheral component interconnect express (PCIe) interface, and the generation of signaling for each lane of the at least two lanes of the link comprises a generation of the peripheral component interconnect express (PCIe) interface.

16. The method of claim 15, wherein the component comprises a PCIe endpoint or a PCIe root complex.

17. An apparatus, comprising:
a bus interface configured to couple the apparatus to a component through a link and configured to perform operations comprising:
receiving a link configuration change request from the component through the link to reconfigure the link from a first link configuration to a second link configuration, wherein the link configuration change request includes a first value indicating a first number of lanes of the link configured as a bidirectional lane, a second value indicating a second number of lanes of the link configured as a unidirectional transmit lane, and a third value indicating a third number of lanes of the link configured as a unidirectional receive lane,
wherein the second link configuration indicates a lane configuration and a generation of signaling for each lane of at least two lanes of the link, including a first lane having a first generation of signaling and a second lane having a second generation of signaling that is different than the first generation of signaling, and
wherein the lane configuration indicates is a bidirectional lane, a unidirectional transmit lane, or a unidirectional receive lane; and
communicating over the link based on the link configuration change request.

18. The apparatus of claim 17, wherein at least one lane configuration of the first link configuration is bidirectional and at least one lane configuration of the second link configuration is bidirectional.

19. The apparatus of claim 17, wherein:

the bus interface comprises a register configured to store a value corresponding to a link configuration for the link, the bus interface comprises a peripheral component interconnect express (PCIe) interface, and the component comprises a PCIe endpoint or a PCIe root complex.

20. A method, comprising:

receiving a link configuration change request from a component through a bus to reconfigure a link from a first link configuration to a second link configuration, wherein the link configuration change request includes a first value indicating a first number of lanes of the link configured as a bidirectional lane, a second value indicating a second number of lanes of the link configured as a unidirectional transmit lane, and a third value indicating a third number of lanes of the link configured as a unidirectional receive lane, wherein the second link configuration indicates a lane configuration and a generation of signaling for at least two lanes of the link, including a first lane having a first generation of signaling and a second lane having a second generation of signaling that is different than the first generation of signaling, and wherein the lane configuration indicates a bidirectional lane, a unidirectional transmit lane, or a unidirectional receive lane; and communicating over the bus based on the link configuration change request.

21. The method of claim 20, wherein at least one lane configuration of the first link configuration is bidirectional and at least one lane configuration of the second link configuration is bidirectional.

22. The method of claim 20, wherein:

the receiving is performed by a bus interface comprising a register configured to store a value corresponding to a link configuration for the link, the bus interface comprises a peripheral component interconnect express (PCIe) interface, and the component comprises a PCIe endpoint or a PCIe root complex.

* * * * *